United States Patent
Zhou et al.

(10) Patent No.: US 10,666,164 B2
(45) Date of Patent: May 26, 2020

(54) BIDIRECTIONAL POWER CONVERSION CIRCUIT AND BIDIRECTIONAL POWER CONVERTER

(71) Applicant: HUAWEI TECHNOLOGIES CO., LTD., Shenzhen, Guangdong (CN)

(72) Inventors: Kui Zhou, Shenzhen (CN); Yiping Huang, Shenzhen (CN); Haoren Shan, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/014,862

(22) Filed: Jun. 21, 2018

(65) Prior Publication Data
US 2018/0302007 A1    Oct. 18, 2018

Related U.S. Application Data

(63) Continuation of application No. PCT/CN2016/108605, filed on Dec. 5, 2016.

(30) Foreign Application Priority Data

Dec. 22, 2015 (CN) .......................... 2015 1 0976555

(51) Int. Cl.
*H02M 7/797* (2006.01)
*H02M 7/5388* (2007.01)
(Continued)

(52) U.S. Cl.
CPC ............ *H02M 7/797* (2013.01); *H02M 1/42* (2013.01); *H02M 7/5387* (2013.01);
(Continued)

(58) Field of Classification Search
CPC .. H02M 1/08; H02M 3/33569; H02M 7/5387; H02M 7/53871; H03K 17/567; H03K 17/6874

See application file for complete search history.

(56) References Cited

U.S. PATENT DOCUMENTS 6,385,058 B1    5/2002 O'Meara
2010/0321966 A1*  12/2010 Mochikawa ............ H02M 1/08
                                            363/123
(Continued)

FOREIGN PATENT DOCUMENTS

CN      1870408 A    11/2006
CN    101707441 A     5/2010
(Continued)

*Primary Examiner* — Jue Zhang
*Assistant Examiner* — Lakaisha Jackson
(74) *Attorney, Agent, or Firm* — Womble Bond Dickinson (US) LLP

(57) ABSTRACT

Disclosed is a bidirectional conversion circuit, including a first bidirectional conductive network, a second bidirectional conductive network, a first switching transistor, a second switching transistor, a first diode, and a second diode, where the first bidirectional conductive network is connected in series to the first switching transistor to form a first branch, and a first end of the first branch is connected to a cathode of the first diode to form a first endpoint; and the second bidirectional conductive network is connected in series to the second switching transistor to form a second branch, and a second end of the second branch is connected to an anode of the second diode to form a third endpoint.

12 Claims, 9 Drawing Sheets

(51) Int. Cl.
*H02M 7/5387* (2007.01)
*H02M 1/42* (2007.01)

(52) U.S. Cl.
CPC ......... *H02M 7/5388* (2013.01); *Y02B 70/126* (2013.01); *Y02B 70/1483* (2013.01)

(56) References Cited

U.S. PATENT DOCUMENTS

| | | | |
|---|---|---|---|
| 2011/0090717 A1 | 4/2011 | Lee et al. | |
| 2012/0250372 A1* | 10/2012 | Knill | H02M 3/3374 363/37 |
| 2012/0250373 A1 | 10/2012 | Adam | |
| 2013/0194831 A1* | 8/2013 | Hu | H02M 3/33507 363/21.01 |
| 2015/0022164 A1* | 1/2015 | Ye | H02M 1/4225 323/210 |
| 2016/0241132 A1 | 8/2016 | Lin et al. | |
| 2016/0285386 A1* | 9/2016 | Kataoka | H03K 17/122 |
| 2017/0294845 A1* | 10/2017 | Kusama | H02M 1/08 |
| 2018/0061982 A1* | 3/2018 | Sambi | H01L 21/02233 |

FOREIGN PATENT DOCUMENTS

| | | |
|---|---|---|
| CN | 201682429 U | 12/2010 |
| CN | 101951147 A | 1/2011 |
| CN | 102130580 A | 7/2011 |
| CN | 102130581 A | 7/2011 |
| CN | 102647099 A | 8/2012 |
| CN | 104518656 A | 4/2015 |
| CN | 204597773 U | 8/2015 |
| CN | 103414338 B | 9/2015 |
| DE | 10204882 A1 | 8/2003 |
| EP | 2110934 A1 | 10/2009 |
| JP | 2008193839 A | 8/2008 |
| JP | 2014017917 A | 1/2014 |
| JP | 2014180111 A | 9/2014 |
| KR | 2009-0096745 A | 9/2009 |
| KR | 101031217 B1 | 4/2011 |
| KR | 2012-0112148 A | 10/2012 |
| WO | 2015079762 A1 | 6/2015 |

* cited by examiner

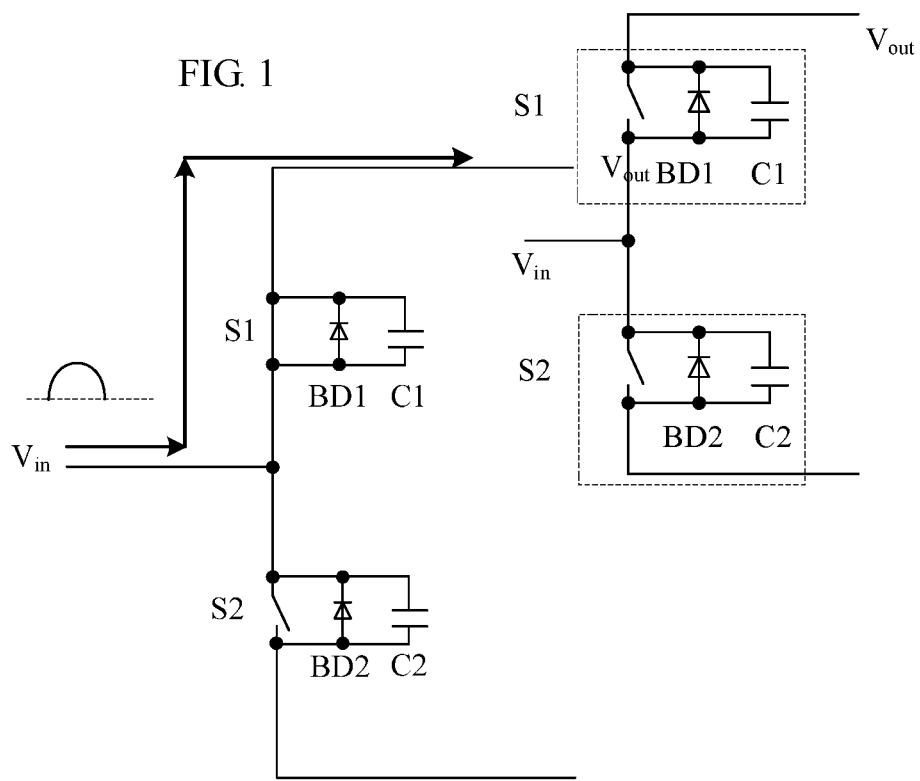

BIDIRECTIONAL POWER CONVERSION CIRCUIT AND BIDIRECTIONAL POWER CONVERTER

CROSS-REFERENCE TO RELATED APPLICATIONS

This application is a continuation of International Application No. PCT/CN2016/108605, filed on Dec. 5, 2016, which claims priority to Chinese Patent Application No. 201510976555.4, filed on Dec. 22, 2015. The disclosures of the aforementioned applications are hereby incorporated by reference in their entireties.

TECHNICAL FIELD

This application relates to the power conversion field, and in particular, to a bidirectional conversion circuit and a bidirectional converter in power conversion technologies.

BACKGROUND

A conventional totem pole circuit includes two series switching transistors, and the switching transistors each have a parasitic diode and a parasitic capacitor internally.

If a conventional totem pole operates in a scenario of synchronous rectification, a current is continuous, and an output voltage is a high voltage greater than 400 V, a device having a withstand voltage of more than 400 V is selected as the switching transistor. A reverse recovery current of a parasitic diode of such device is relatively large.

When a switching transistor is turned off, a reverse recovery current generated by a parasitic diode of the switching transistor may adversely affect the other switching transistor that is just turned on, and may further affect an operating state of an entire circuit in a severe case.

SUMMARY

Embodiments of the present invention provide a bidirectional conversion circuit and a bidirectional converter, to resolve a problem that a conventional totem pole circuit generates a reverse recovery current in a scenario of synchronous rectification.

According to a first aspect, an embodiment of the present invention provides a bidirectional conversion circuit, where the bidirectional conversion circuit includes:

a first bidirectional conductive network, a second bidirectional conductive network, a first switching transistor, a second switching transistor, a first diode, and a second diode, where the first bidirectional conductive network and the first switching transistor are connected in series to form a first branch, where a first end of the first branch is connected to a cathode of the first diode to form a first endpoint;

the second bidirectional conductive network and the second switching transistor are connected in series to form a second branch, where a second end of the second branch is connected to an anode of the second diode to form a third endpoint;

a second end of the first branch, an anode of the first diode, a first end of the second branch, and a cathode of the second diode are connected to form a second endpoint;

the first switching transistor is turned on from a first time to a second time, and is turned off from the second time to a fifth time; and the second switching transistor is turned off from the first time to a third time, is turned on from the third time to a fourth time, and is turned off from the fourth time to the fifth time, where the first time is a start time of a positive half cycle of a current flowing into or flowing out of the second endpoint, the third time is an end time of the positive half cycle of the current, the second time is any time within a time interval from the first time to the third time, the fifth time is an end time of a negative half cycle of the current, and the fourth time is any time within a time interval from the third time to the fifth time.

Therefore, the first diode, the second diode, the first bidirectional conductive network, and the second bidirectional conductive network are added to the conventional totem pole circuit, and the first switching transistor and the second switching transistor are controlled to be turned on or off at different times, to avoid generation of a reverse recovery current in the circuit, thereby improving performance of the bidirectional conversion circuit.

With reference to the first aspect, it may be understood that, the first bidirectional conductive network is a metal-oxide-semiconductor field-effect transistor (MOSFET), an insulated gate bipolar transistor (IGBT), or two parallel diodes having opposite polarities. The MOSFET may be one MOSFET or at least two series MOSFETs, and the IGBT may be one IGBT or at least two series IGBTs.

With reference to the first aspect, it may be understood that, the second bidirectional conductive network is an MOSFET, an IGBT, or two parallel diodes having opposite polarities. The MOSFET may be one MOSFET or at least two series MOSFETs, and the IGBT may be one IGBT or at least two series IGBTs.

With reference to the first aspect, it may be understood that, a conductive voltage drop of the first bidirectional conductive network is less than a conductive voltage drop of the first diode, and a sum of the conductive voltage drop of the first bidirectional conductive network and a conductive voltage drop of a parasitic diode of the first switching transistor is greater than the conductive voltage drop of the first diode; and a conductive voltage drop of the second bidirectional conductive network is less than a conductive voltage drop of the second diode, and a sum of the conductive voltage drop of the second bidirectional conductive network and a conductive voltage drop of a parasitic diode of the second switching transistor is greater than the conductive voltage drop of the second diode.

With reference to the first aspect, optionally, the first switching transistor is a MOSFET or an IGBT; and the second switching transistor is an MOSFET or an IGBT.

With reference to the first aspect, optionally, the first diode is a fast recovery diode or a silicon carbide (SiC) diode; and the second diode is a fast recovery diode or a SiC diode.

With reference to the first aspect, it may be understood that, the bidirectional conversion circuit is used for a synchronous rectification circuit or an inverter circuit.

With reference to the first aspect, it may be understood that, the bidirectional conversion circuit further includes a controller, where the controller is configured to: control the first switching transistor to be turned on or off;

control the second switching transistor to be turned on or off; or control the first switching transistor and the second switching transistor to be turned on or off.

Therefore, the bidirectional conversion circuit provided in this embodiment of the present invention may be applied to a scenario of synchronous rectification, to resolve a problem of a reverse recovery current of high voltage synchronous rectification, and can increase the rectification efficiency at the same time. The bidirectional conversion circuit may also be used in an inversion scenario. In the inversion scenario, parasitic capacitors of the switching transistors are dischargeable.

According to a second aspect, a bidirectional converter is provided, where the bidirectional converter includes:

a first bidirectional conversion circuit according to the first aspect or any implementation of the first aspect; a second bidirectional conversion circuit according to the first aspect or any implementation of the first aspect; and a third bidirectional conversion circuit according to the first aspect or any implementation of the first aspect;

a transformer, where the transformer includes a primary-side winding and a secondary-side winding, one end of the secondary-side winding of the transformer is connected to a second endpoint of the first bidirectional conversion circuit, and the other end of the secondary-side winding of the transformer is connected to a second endpoint of the second bidirectional conversion circuit;

a resonant cavity, where the resonant cavity includes a first port, a second port, a third port, and a fourth port, the first port is connected to a second endpoint of the third bidirectional conversion circuit, the second port is connected to a third endpoint of the third bidirectional conversion circuit, and the third port and the fourth port are separately connected to the primary-side winding of the transformer; and a bridgeless power factor correction (PFC) circuit, where the bridgeless PFC circuit includes two alternating current (AC) ports and two direct current (DC) ports, and the two DC ports are separately connected to a first endpoint and the third endpoint of the third bidirectional conversion circuit.

With reference to the second aspect, it may be understood that, the bidirectional converter further includes: a capacitor, where a first endpoint of the first bidirectional conversion circuit is connected to a first endpoint of the second bidirectional conversion circuit and is connected to a positive end of the capacitor, and a third endpoint of the first bidirectional conversion circuit is connected to a third endpoint of the second bidirectional conversion circuit and is connected to a negative end of the capacitor.

Based on the foregoing technical solutions, the first diode, the second diode, the first bidirectional conductive network, and the second bidirectional conductive network are added to the conventional totem pole circuit, and the first switching transistor and the second switching transistor are controlled to be turned on or off at different times, to increase efficiency of the bidirectional conversion circuit, and avoid generation of a reverse recovery current in the circuit, thereby improving performance of the bidirectional conversion circuit.

BRIEF DESCRIPTION OF DRAWINGS

FIG. 1 is a schematic diagram of a conventional totem pole circuit structure;

FIG. 2A and FIG. 2B are schematic diagrams showing that the circuit structure shown in FIG. 1 is applied to a scenario of synchronous rectification;

DESCRIPTION OF EMBODIMENTS

The following describes the technical solutions in the embodiments of the present invention with reference to the accompanying drawings in the embodiments of the present invention.

FIG. 1 is a schematic block diagram of a conventional totem pole circuit. As shown in FIG. 1, the conventional totem pole circuit includes two series switching transistors S1 and S2. The switching transistor S1 includes a parasitic diode BD1 and a parasitic capacitor C1 internally, and the switching transistor S2 includes a parasitic diode BD2 and a parasitic capacitor C2 internally. $V_{in}$ may be an input end, and $V_{out}$ may be an output end.

Figure 2B:
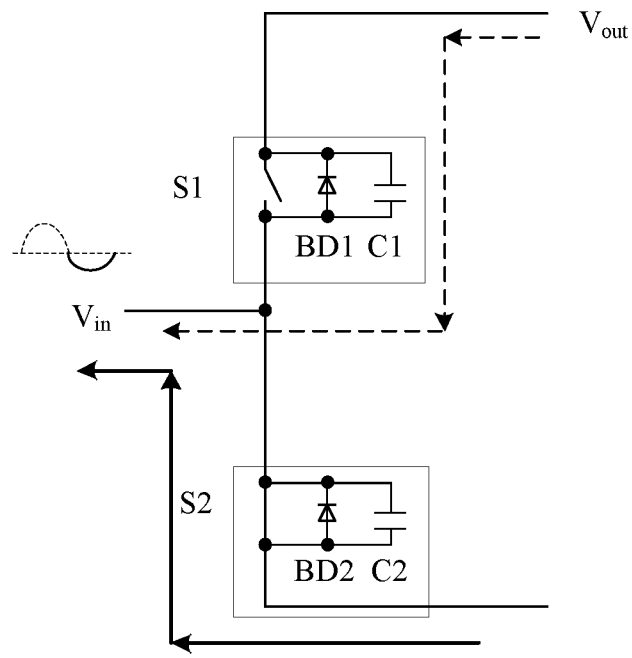

The conventional totem pole circuit may be applied to a scenario of synchronous rectification. As shown in FIG. 2A, within a positive half cycle of an input alternating voltage, the switching transistor S1 is turned on, and the switching transistor S2 is turned off. A current flows through an intermediate node of the switching transistor S1 and the switching transistor S2, and flows out from the switching transistor S1. As shown in FIG. 2B, within a negative half cycle of the alternating input voltage, the switching transistor S1 is turned off, and the switching transistor S2 is turned on. A current flows through the switching transistor S2, and flows out from the intermediate node of the switching transistor S1 and the switching transistor S2. The switching transistor S1 and the switching transistor S2 are turned on alternately, and the circuit may implement the synchronous rectification effect.

It should be understood that, because reverse recovery currents of the parasitic diodes of the two switching transistors are relatively large, a reverse recovery current resulted from turning off a switching transistor may adversely affect the other switching transistor that is just turned on, and may affect an operating state of the entire circuit in a severe case.

For example, as shown in FIG. 2A and FIG. 2B, within the positive half cycle of the alternating input voltage, the current is shown as a solid line in FIG. 2A, and the current flows through the switching transistor S1 that is turned on. Within the negative half cycle of the alternating input voltage, the switching transistor S1 is turned off, and the parasitic diode BD1 of the switching transistor S1 generates a reverse recovery current that is shown as a dashed line in FIG. 2B, adversely affecting the switching transistor S2 that is just turned on.

Therefore, according to a bidirectional conversion circuit and a bidirectional converter in the embodiments of the present invention, a first diode, a second diode, a first bidirectional conductive network, and a second bidirectional conductive network are added to the conventional totem pole circuit, and the first switching transistor and the second switching transistor are controlled to be turned on or off at different times, to increase efficiency of the bidirectional conversion circuit, and avoid generation of a reverse recovery current in the circuit, thereby improving performance of the bidirectional conversion circuit.

Figure 3A:
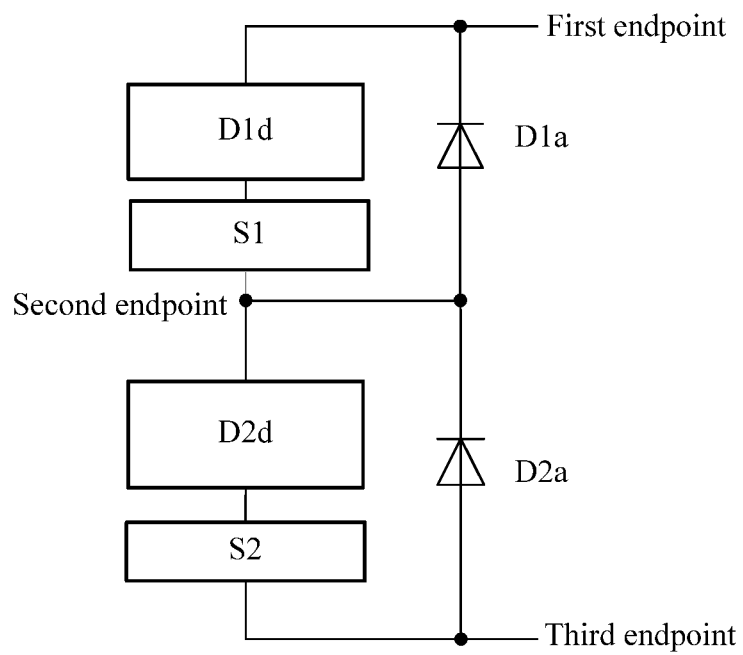
FIG. 3A is a schematic diagram of a circuit structure of a bidirectional conversion circuit according to an embodiment of the present invention.

FIG. 3A is a schematic diagram of a circuit structure of a bidirectional conversion circuit 100 according to an embodiment of the present invention. The bidirectional conversion circuit 100 includes a first bidirectional conductive network D1d, a second bidirectional conductive network D2d, a first switching transistor S1, a second switching transistor S2, a first diode D1a, and a second diode D2a.

The first bidirectional conductive network D1d and the first switching transistor S1 are connected in series to form a first branch, where a first end of the first branch is connected to a cathode of the first diode D1a to form a first endpoint.

The second bidirectional conductive network D2d and the second switching transistor S2 are connected in series to form a second branch, where a second end of the second branch is connected to an anode of the second diode D2a to form a third endpoint.

A second end of the first branch, an anode of the first diode D1a, a first end of the second branch, and a cathode of the second diode D2a are connected to form a second endpoint.

The first switching transistor S1 is turned on from a first time t1 to a second time t2, and is turned off from the second time t2 to a fifth time t5. The second switching transistor S2 is turned off from the first time t1 to a third time t3, is turned on from the third time t3 to a fourth time t4, and is turned off from the fourth time t4 to the fifth time t5.

Optionally, within a positive half cycle of an input alternating voltage, which may be from the first time t1 to the third time t3, the first branch and the first diode D1a are alternately turned on. Within a negative half cycle of the input alternating voltage, which may be from the third time t3 to the fifth time t5, the second branch and the second diode D2a are alternately turned on.

Specifically, according to the bidirectional conversion circuit in this embodiment of the present invention, the first diode D1a, the second diode D2a, the first bidirectional conductive network D1d, and the second bidirectional conductive network D2d are added based on the conventional totem pole circuit. In addition, the first switching transistor S1 or the second switching transistor S2 is controlled to be turned on or off from the first time t1 to the fifth time t5, to alternately turn on the first branch, the first diode D1a, the second branch, and the second diode D2a, so that a reverse recovery current cannot be generated in the circuit, and the circuit can implement bidirectional conversion of the AC voltage/DC voltage.

For example, when the first endpoint and the third endpoint are input ends, and the second endpoint is an output end, the bidirectional conversion circuit is an inverter circuit. Conversely, when the second endpoint is an input end, and the first endpoint and the third endpoint are output ends, the bidirectional conversion circuit is a rectification circuit.

Optionally, the first time t1 may be a start time of a positive half cycle of a current flowing into or flowing out of the second endpoint, the third time t3 may be an end time of the positive half cycle of the current, the second time t2 may be any time within a time interval from the first t1 time to the third time t3, the fifth time t5 may be an end time of a negative half cycle of the current, and the fourth time t4 may be any time within a time interval from the third time t3 to the fifth time t5.

Optionally, the bidirectional conversion circuit 100 in this embodiment of the present invention may include a controller. The controller may be configured to control the first switching transistor S1 and the second switching transistor S2 to be turned on or off.

Specifically, the controller may control the first switching transistor S1 to be turned on from the first time t1 to the second time t2, and to be turned off from the second time t2 to the fifth time t5; and may control the second switching transistor S2 to be turned off from the first time t1 to the third time t3, to be turned on from the third time t3 to the fourth time t4, and to be turned off from the fourth time t4 to the fifth time t5.

Figure 3B:
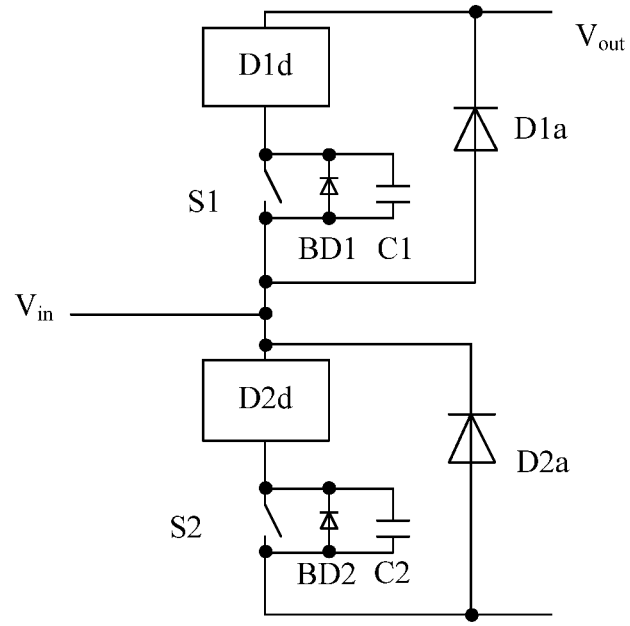
FIG. 3B is a schematic diagram of another circuit structure of a bidirectional conversion circuit according to an embodiment of the present invention.

FIG. 3B is a schematic diagram of another circuit structure of a bidirectional conversion circuit according to an embodiment of the present invention. A switching transistor may include a parasitic capacitor and a parasitic diode. Specifically, a first switching transistor S1 may include a parasitic capacitor C1 and a parasitic diode BD1, and a second switching transistor S2 may include a parasitic capacitor C2 and a parasitic diode BD2.

It should be understood that, the parasitic capacitor C1 and the parasitic capacitor C2 may be dischargeable in an inversion scenario, thereby implementing soft switching of the switching transistors.

It should be further understood that, positions of the first switching transistor S1 and a first bidirectional conductive network D1d on a first branch are not limited in the bidirectional conversion circuit provided in this embodiment of the present invention. For example, the first switching transistor S1 may approach a second endpoint, or the first bidirectional conductive network D1d may approach the second endpoint. Similarly, positions of the second switching transistor S2 and a second bidirectional conductive network D2d on a second branch are not limited either. For example, the second switching transistor S2 may approach the second endpoint, or the second bidirectional conductive network D2d may approach the second endpoint.

Based on the foregoing technical solutions, according to the bidirectional conversion circuit and a bidirectional converter in the embodiments of the present invention, a first diode D1a, a second diode D2a, the first bidirectional conductive network D1d, and the second bidirectional conductive network D2d are added to the conventional totem pole circuit, and the first switching transistor S1 and the second switching transistor S2 are controlled to be turned on or off at different times, to increase efficiency of the bidirectional conversion circuit, and avoid generation of a reverse recovery current in the circuit, thereby improving performance of the bidirectional conversion circuit.

FIG. 4A to FIG. 4D are schematic diagrams showing that the circuit structure shown in FIG. 3B is applied to a scenario of synchronous rectification according to one embodiment. As shown in FIG. 4A to FIG. 4D, the first branch and the first diode D1a, and the second branch and the second diode D2a are alternately turned on for a current, so that an input alternating voltage is converted into a DC voltage for output. A specific working process is shown in FIG. 4A to FIG. 4D.

Figure 4A:
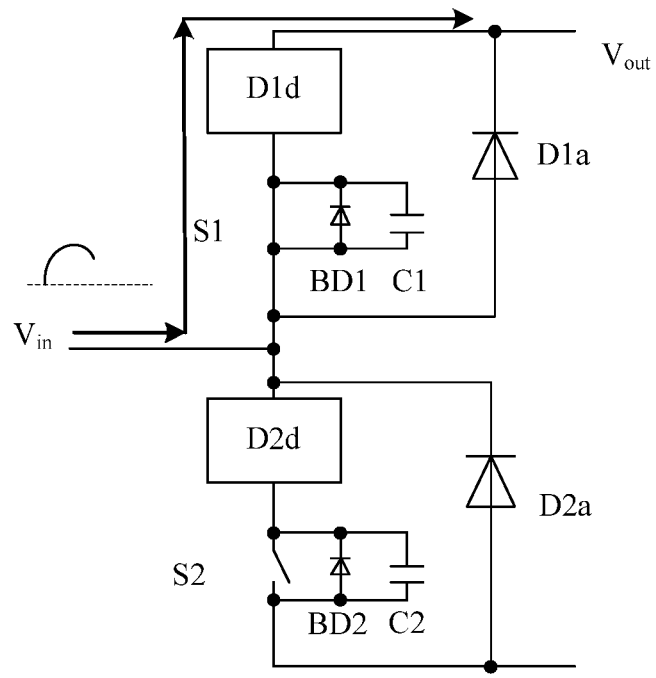
FIG. 4A to FIG. 4D are schematic diagrams showing that the circuit structure shown in FIG. 3B is applied to a scenario of synchronous rectification according to an embodiment of the present invention.
Figure 4B:
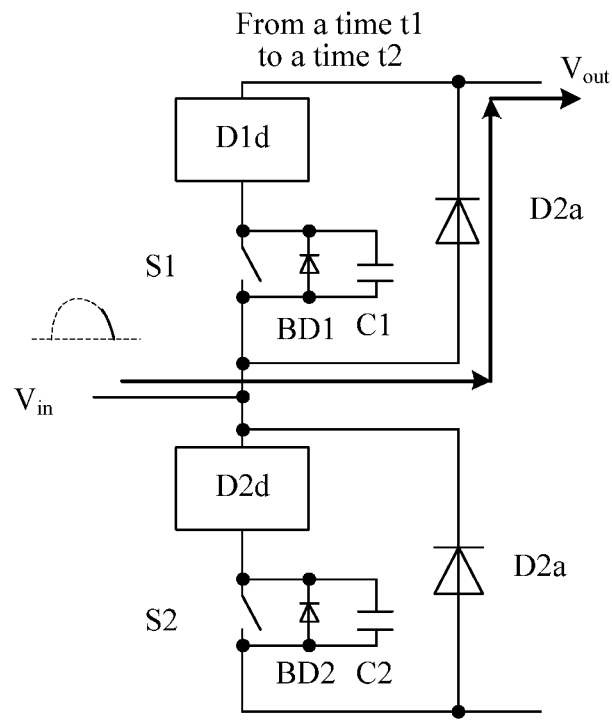

$V_{in}$ may be an input end, and $V_{out}$ may be an output end. Within a positive half cycle of an input alternating voltage, the second switching transistor S2 is turned off. As shown in FIG. 4A, from a first time t1 to a second time t2, the first switching transistor S1 is turned on, and a current may flow into the second endpoint, flow through the first branch, and flow out from a first endpoint. As shown in FIG. 4B, from the second time t2 to a third time t3, the first switching transistor S1 is turned off, and the current may flow into the second endpoint, flow through the first diode D1a, and flow out from the first endpoint.

Figure 4C:
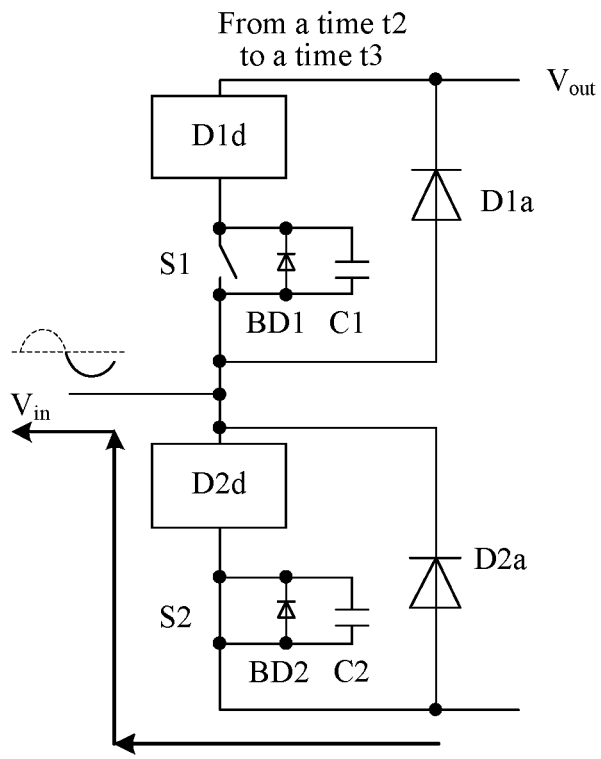
Figure 4D:
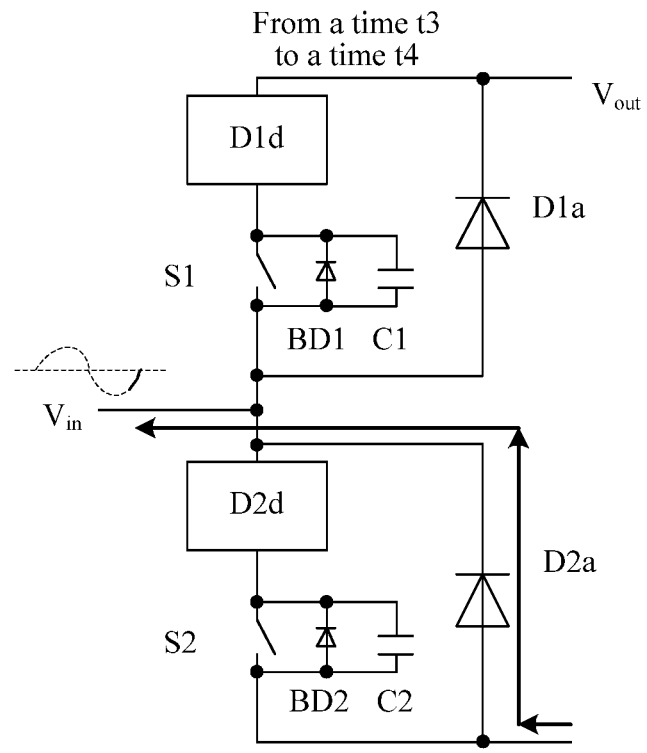

Within a negative half cycle of the input alternating voltage, the first switching transistor S1 is turned off. As shown in FIG. 4C, from the third time t3 to a fourth time t4, the second switching transistor S2 is turned on, and the current may flow into a third endpoint, flow through the second branch, and flow out from the second endpoint. As shown in FIG. 4D, from the fourth time t4 to a fifth time t5, the second switching transistor S2 is turned off, and the current may flow into the third endpoint, flow through the second diode D2a, and flow out from the second endpoint.

Specifically, the current may choose to flow through a branch having a lower conductive voltage drop, also simply referred to as a voltage drop. From the first time t1 to the second time t2 in the positive half cycle of the input alternating voltage, the first switching transistor S1 is turned on, and the second switching transistor S2 is turned off. A conductive voltage drop of the first bidirectional conductive network D1d on the first branch is less than a conductive voltage drop of the first diode D1a. The current may flow into the second endpoint, flow through the first branch, and flow out from the first endpoint. Similarly, from the third time t3 to the fourth time t4 of the negative half cycle of the input alternating voltage, the first switching transistor S1 is turned off, and the second switching transistor S2 is turned on. A conductive voltage drop of the second bidirectional conductive network D2d is less than a conductive voltage drop of the second diode D2a. The current may flow into the third endpoint, flow through the second branch, and flow out from the second endpoint.

It should be understood that, from the third time t3 to the fourth time t4 of the positive half cycle of the input alternating voltage, to avoid that a reverse recovery current is generated instantly after the first switching transistor S1 is turned off, the current may be enabled to flow through the first diode D1a instead of the first switching transistor S1. Therefore, a sum of a conductive voltage drop of the first bidirectional conductive network D1d and a conductive voltage drop of the parasitic diode BD1 of the first switching transistor S1 may be greater than the conductive voltage drop of the first diode D1a. From the fourth time t4 to the fifth time t5 of the negative half cycle of the input alternating voltage, to avoid that a reverse recovery current is generated instantly after the second switching transistor S2 is turned off, the current may be enabled to flow through the second diode D2a instead of the second switching transistor S2. Therefore, a sum of a conductive voltage drop of the second bidirectional conductive network D2d and a conductive voltage drop of the parasitic diode BD2 of the second switching transistor S2 may be greater than the conductive voltage drop of the second diode Da2.

For example, the conductive voltage drop of the first bidirectional conductive network D1d is 1 V, the conductive voltage drop of the parasitic diode BD1 of the first switching transistor S1 is 1 V, and the conductive voltage drop of the first diode D1a is 1.5 V. The sum of the conductive voltage drop of the first bidirectional conductive network D1d and the conductive voltage drop of the parasitic diode BD1 of the first switching transistor S1 is 2 V, and is greater than the conductive voltage drop of the first diode D1a. Therefore, from the second time t2 to the third time t3, the current chooses to flow through the first diode D1a instead of the parasitic diode BD1 of the first switching transistor S1, to avoid generation of a reverse recovery current when the first switching transistor S1 is turned off at the third time t3.

It should be understood that, when this embodiment of the present invention is used in a synchronous rectification circuit, the current is enabled to flow through the first diode D1a instead of the first branch from the second time t2 to the third time t3, and to flow through the second diode D2a instead of the second branch from the fourth time t4 to the fifth time t5, to avoid generation of a reverse recovery current in a switching transistor in a scenario of synchronous rectification, thereby improving performance of the circuit.

It should be further understood that, in the circuit, to increase the rectification efficiency, the current may be controlled to flow through the first branch and the second branch in most time, and to flow through the first diode D1a and the second diode D2a in little time. For example, the second time t2 and the fourth time t4 may be times when the input alternating voltage approaches 0. In this case, a time interval from the first time t1 to the second time t2 is far greater than a time interval from the second time t2 to the third time t3, and a time interval from the third time t3 to the fourth time t4 is far greater than a time interval from the fourth time t4 to the fifth time t5. In addition, when the first switching transistor S1 is turned on, the conductive voltage drop of the first branch is less than the conductive voltage drop of the first diode D1a. When the second switching transistor S2 is turned on, the conductive voltage drop of the second branch is less than the conductive voltage drop of the second diode D2a. Therefore, the current in the circuit flows through the first branch and the second branch in most time, to avoid generation of a reverse recovery current while improving the rectification efficiency of the circuit.

Optionally, in this embodiment of the present invention, the first diode D1a and the second diode D2a may be fast recovery diodes or SiC diodes.

Figure 5:
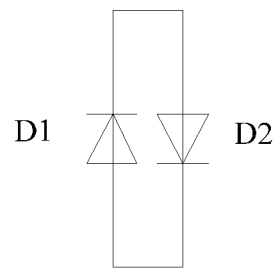
FIG. 5 is a schematic diagram of a circuit structure of a bidirectional conductive network according to an embodiment of the present invention.

Optionally, as shown in FIG. 5, the first bidirectional conductive network D1d or the second bidirectional conductive network D2d may be two parallel diodes D1 and D2 having opposite polarities.

Optionally, the first bidirectional conductive network D1d or the second bidirectional conductive network D2d may be one MOSFET transistor, or may be at least two series MOSFET transistors.

Optionally, the first bidirectional conductive network D1d or the second bidirectional conductive network D2d may alternatively be one insulated gate bipolar transistor, or may be at least two series IGBT transistors.

Figure 6A:
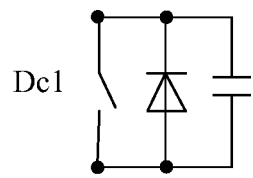
FIG. 6A and FIG. 6B are schematic diagrams of another circuit structure of a bidirectional conductive network according to an embodiment of the present invention.
Figure 6B:
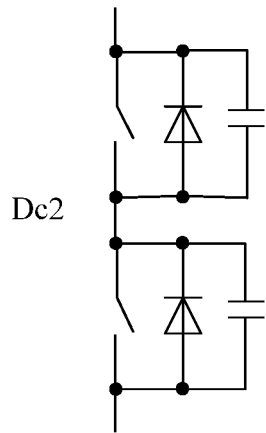

For example, as shown in FIG. 6A, the first bidirectional conductive network D1d or the second bidirectional conductive network D2d may be one metal-oxide-semiconductor field-effect transistor Dc1 or one insulated gate bipolar transistor Dc1. Alternatively, as shown in FIG. 6B, the first bidirectional conductive network D1d or the second bidirectional conductive network D2d may be two series MOSFET transistors Dc2 or two series IGBT transistors Dc2.

FIG. 7A to FIG. 7D are schematic diagrams showing that the circuit structure shown in FIG. 3B is applied to an inversion scenario. As shown in FIG. 7A to FIG. 7D, the first branch and the first diode D1a, and the second branch and the second diode D2a are alternately turned on for a current, so that an input DC voltage is converted into an alternating voltage. A specific working process is shown in FIG. 7A to FIG. 7D.

Figure 7A:
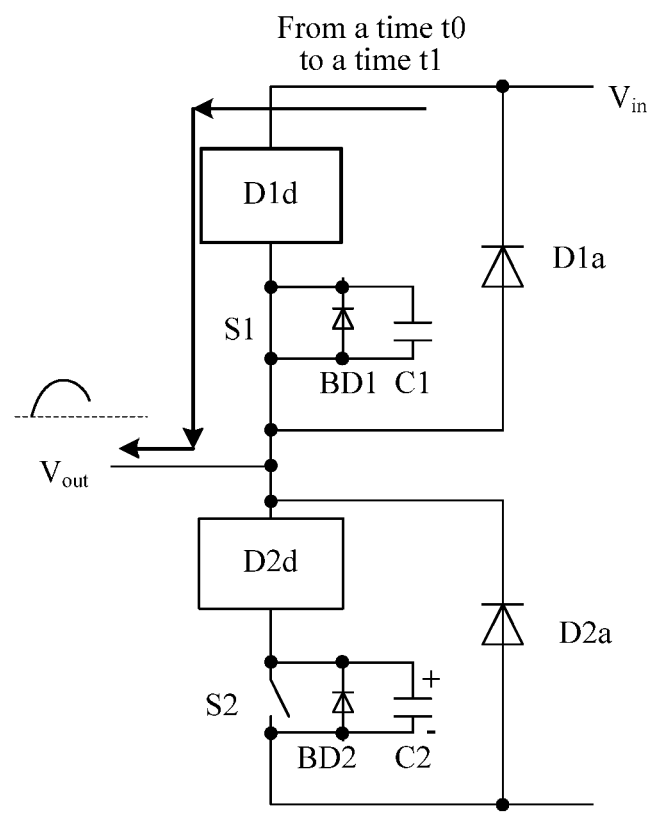
FIG. 7A to FIG. 7D are schematic diagrams showing that the circuit structure shown in FIG. 3B is applied to an inversion scenario according to an embodiment of the present invention.
Figure 7B:
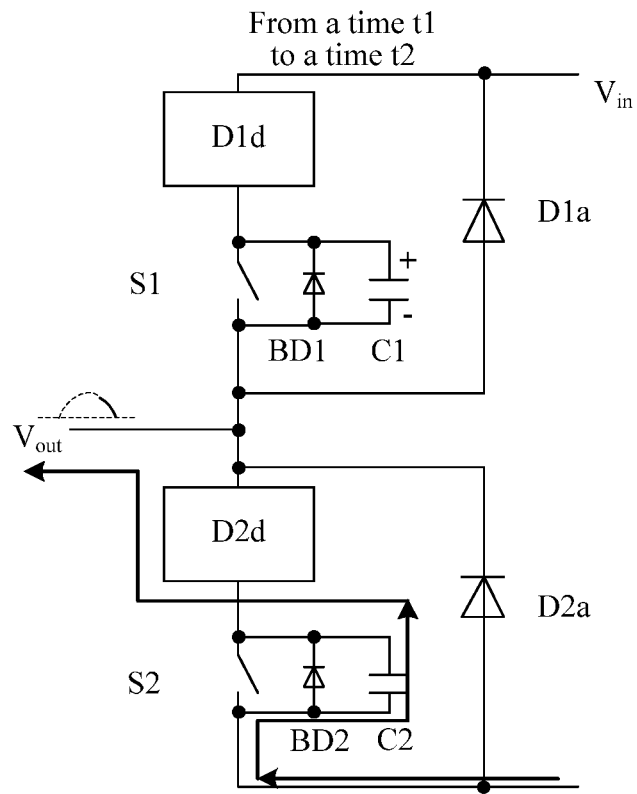

$V_{in}$ may be an input end, and $V_{out}$ may be an output end. Within a positive half cycle of an output alternating voltage, the second switching transistor S2 is turned off. As shown in FIG. 7A, from a first time t1 to a second time t2, the first switching transistor S1 is turned on, and a current may flow into a first endpoint, flow through the first branch, and flow out from the second endpoint. As shown in FIG. 7B, from the second time t2 to a third time t3, the first switching transistor S1 is turned off, and the current may flow into a third endpoint, flow through the second branch, and flow out from the second endpoint.

Figure 7C:
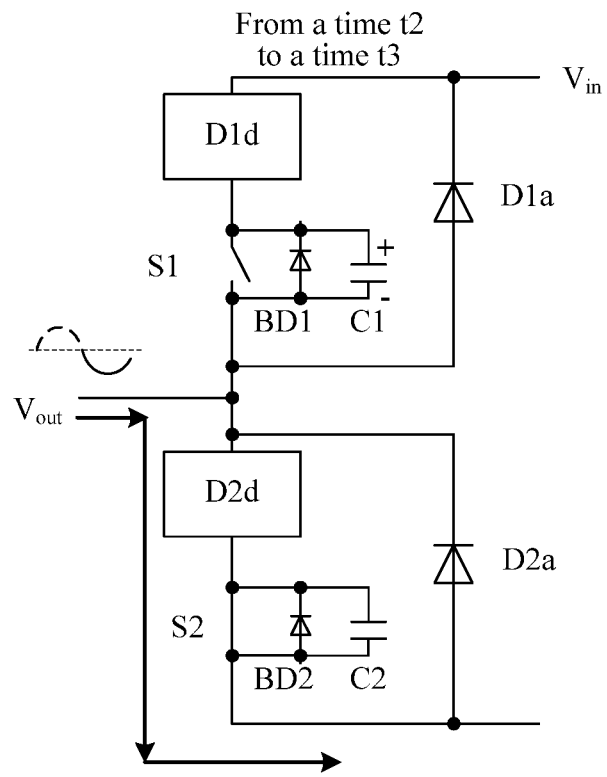
Figure 7D:
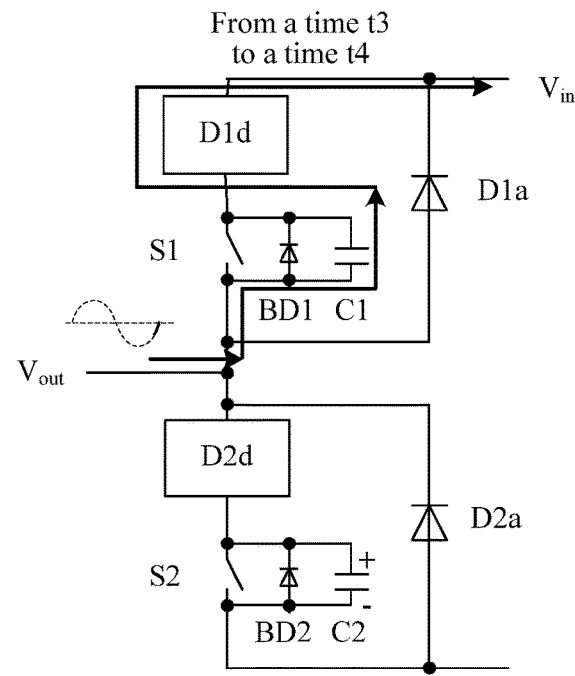

Within a negative half cycle of the output alternating voltage, the first switching transistor S1 is turned off. As shown in FIG. 7C, from the third time t3 to a fourth time t4, the second switching transistor S2 is turned on, and the current may flow into the second endpoint, flow through the second branch, and flow out from the third endpoint. As shown in FIG. 7D, from the fourth time t4 to a fifth time t5, the second switching transistor S2 is turned off, and the current may flow into the second endpoint, flow through the first branch, and flow out from the first endpoint.

Specifically, from the second time t2 to the third time t3, the first switching transistor S1 and the second switching transistor S2 are turned off, and the parasitic capacitor C2 may discharge by using the second bidirectional conductive network D2d. Similarly, from the fourth time t4 to the fifth time t5, the parasitic capacitor C1 may discharge by using the first bidirectional conductive network D1d, so that the first switching transistor S1 and the second switching transistor S2 can implement soft switching, and the entire performance of the circuit can be improved.

Optionally, the first switching transistor S1 or the second switching transistor S2 may be an MOSFET or an IGBT.

It should be understood that, the bidirectional conversion circuit 100 in this embodiment of the present invention may also be applied to another scenario, for example, a scenario of bridgeless power factor correction.

A bidirectional converter according to an embodiment of the present invention is described in detail below with reference to FIG. 8 and FIG. 9.

Figure 8:
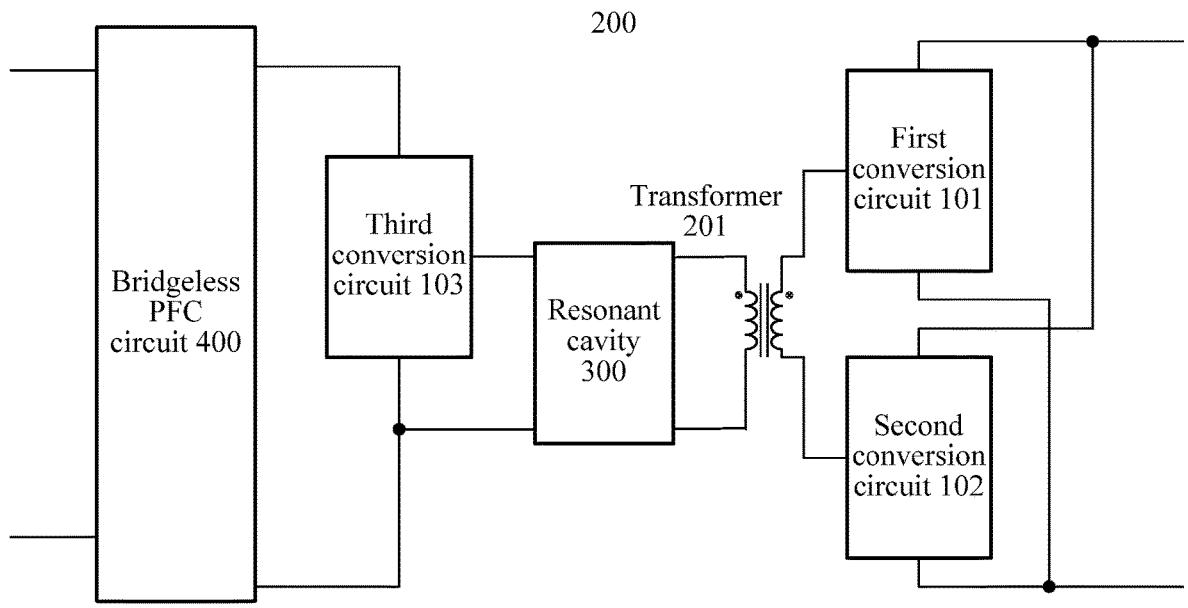
FIG. 8 is a schematic diagram of a circuit structure of a bidirectional converter according to an embodiment of the present invention.

FIG. 8 is a schematic diagram of a circuit structure of a bidirectional converter 200 according to an embodiment of the present invention. As shown in FIG. 8, the bidirectional converter 200 includes:

a first bidirectional conversion circuit 101 described above; a second bidirectional conversion circuit 102 described above; and a third bidirectional conversion circuit 103 described above;

a transformer 201, including a primary-side winding and a secondary-side winding, where one end of the secondary-side winding of the transformer is connected to a second endpoint of the first bidirectional conversion circuit 101, and the other end of the secondary-side winding of the transformer is connected to a second endpoint of the second bidirectional conversion circuit 102;

a resonant cavity 300, including a first port, a second port, a third port, and a fourth port, where the first port is connected to a second endpoint of the third bidirectional conversion circuit 103, the second port is connected to a third endpoint of the third bidirectional conversion circuit 103, and the third port and the fourth port are separately connected to the primary-side winding of the transformer 201; and a bridgeless PFC circuit 400, including two AC ports and two DC ports, where the two DC ports are separately connected to a first endpoint and the third endpoint of the third bidirectional conversion circuit 103.

Specifically, according to one embodiment, one side of the bidirectional converter 200 may be connected to an AC power supply, and the other side of the bidirectional converter 200 may be connected to a DC power supply. The AC power supply outputs an AC voltage. The AC voltage may be converted into a DC voltage by using the bidirectional converter 200, and the DC voltage is input into the DC power supply. The DC power supply outputs a DC voltage. The DC voltage may be converted into an AC by using the bidirectional converter 200, and the AC voltage is input into the AC power supply, to implement bidirectional conversion of the AC voltage/DC voltage.

Figure 9:
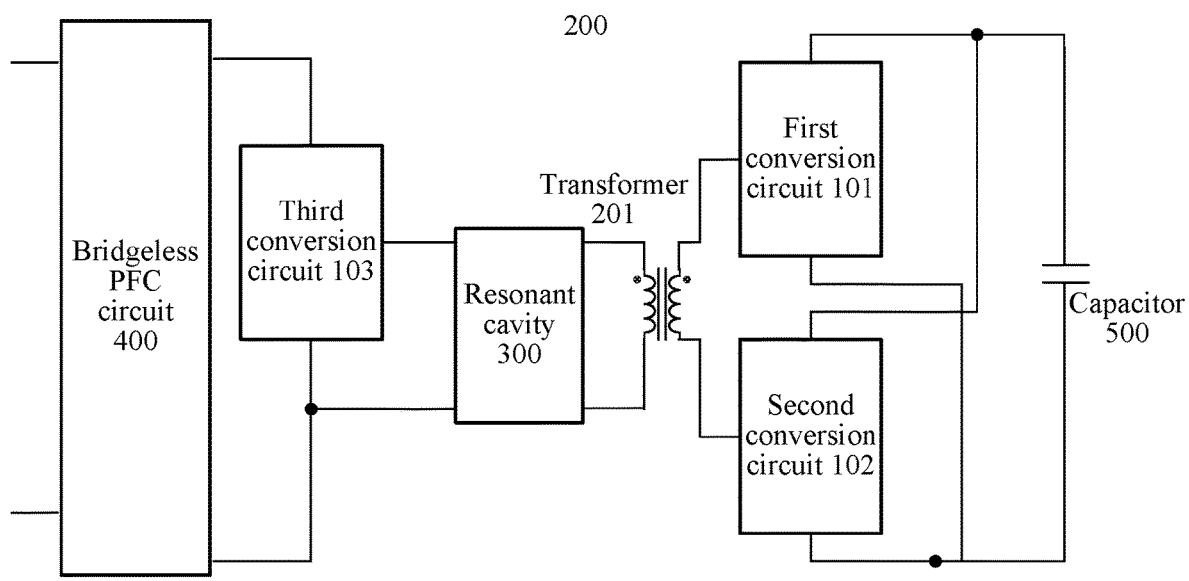
FIG. 9 is a schematic diagram of another circuit structure of a bidirectional converter according to an embodiment of the present invention.

Optionally, as shown in FIG. 9, FIG. 9 is a schematic diagram of another circuit structure of a bidirectional converter according to an embodiment of the present invention. The bidirectional converter 200 may further include a capacitor 500, where a first endpoint of the first bidirectional conversion circuit 101 is connected to a first endpoint of the second bidirectional conversion circuit 102 and is connected to a positive end of the capacitor 500, and a third endpoint of the first bidirectional conversion circuit 101 is connected to a third endpoint of the second bidirectional conversion circuit 102 and is connected to a negative end of the capacitor 500.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the embodiments of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of this application, but are not intended to limit the protection scope of this application. Any variation or replacement readily figured out by a person skilled in the art within the technical scope disclosed in this application shall fall within the protection scope of this application. Therefore, the protection scope of the present application shall be subject to the protection scope of the claims.

What is claimed is:

1. A bidirectional conversion circuit, comprising:
a first bidirectional conductive network, a second bidirectional conductive network, a first switching transistor, a second switching transistor, a first diode, and a second diode, wherein
the first bidirectional conductive network and the first switching transistor are connected in series to form a first branch, wherein a first end of the first branch is connected to a cathode of the first diode to form a first endpoint;
the second bidirectional conductive network and the second switching transistor are connected in series to form a second branch, wherein a second end of the second branch is connected to an anode of the second diode to form a third endpoint;
a second end of the first branch, an anode of the first diode, a first end of the second branch, and a cathode of the second diode are connected to form a second endpoint;
the first switching transistor is turned on from a first time to a second time, and is turned off from the second time to a fifth time; and
the second switching transistor is turned off from the first time to a third time, is turned on from the third time to a fourth time, and is turned off from the fourth time to the fifth time, wherein
the first time is a start time of a positive half cycle of a current flowing into or flowing out of the second endpoint, the third time is an end time of the positive half cycle of the current, the second time is any time within a time interval from the first time to the third time, the fifth time is an end time of a negative half cycle of the current, and the fourth time is any time within a time interval from the third time to the fifth time.

2. The bidirectional conversion circuit according to claim 1, wherein the first bidirectional conductive network is a metal-oxide-semiconductor field-effect transistor (MOSFET), an insulated gate bipolar transistor (IGBT), or two parallel diodes having opposite polarities.

3. The bidirectional conversion circuit according to claim 1, wherein the second bidirectional conductive network is an MOSFET, an IGBT, or two parallel diodes having opposite polarities.

4. The bidirectional conversion circuit according to claim 1, wherein
a conductive voltage drop of the first bidirectional conductive network is less than a conductive voltage drop of the first diode, and a sum of the conductive voltage drop of the first bidirectional conductive network and a conductive voltage drop of a parasitic diode of the first switching transistor is greater than the conductive voltage drop of the first diode; and
a conductive voltage drop of the second bidirectional conductive network is less than a conductive voltage drop of the second diode, and a sum of the conductive voltage drop of the second bidirectional conductive network and a conductive voltage drop of a parasitic diode of the second switching transistor is greater than the conductive voltage drop of the second diode.

5. The bidirectional conversion circuit according to claim 1, wherein
the first switching transistor is a metal-oxide-semiconductor field-effect transistor (MOSFET) or an insulated gate bipolar transistor (IGBT); and
the second switching transistor is an MOSFET or an IGBT.

6. The bidirectional conversion circuit according to claim 1, wherein the first diode is a fast recovery diode or a silicon carbide (SiC) diode; and
the second diode is a fast recovery diode or a silicon carbide SiC diode.

7. The bidirectional conversion circuit according to claim 1, wherein the bidirectional conversion circuit is used for a synchronous rectification circuit or an inverter circuit.

8. The bidirectional conversion circuit according to claim 1, wherein the bidirectional conversion circuit further comprises a controller, wherein the controller is configured to:
control the first switching transistor to be turned on or off;
control the second switching transistor to be turned on or off; or
control the first switching transistor and the second switching transistor to be turned on or off.

9. A bidirectional converter, comprising:
a first bidirectional conversion circuit including a first bidirectional conductive network forming a first branch and a second bidirectional conductive network forming a second branch for conversion of direct current (DC)/alternating current (AC) or AC/DC voltages through the first and second branches;
a second bidirectional conversion circuit;
a third bidirectional conversion circuit;
a transformer, wherein the transformer comprises a primary-side winding and a secondary-side winding, one end of the secondary-side winding of the transformer is connected to a second endpoint of the first bidirectional conversion circuit, and the other end of the secondary-side winding of the transformer is connected to a second endpoint of the second bidirectional conversion circuit;

a resonant cavity, wherein the resonant cavity comprises a first port, a second port, a third port, and a fourth port, the first port is connected to a second endpoint of the third bidirectional conversion circuit, the second port is connected to a third endpoint of the third bidirectional conversion circuit, and the third port and the fourth port are separately connected to the primary-side winding of the transformer; and a bridgeless power factor correction (PFC) circuit, wherein the bridgeless PFC circuit comprises two alternating current (AC) ports and two direct current (DC) ports, and the two DC ports are separately connected to a first endpoint and the third endpoint of the third bidirectional conversion circuit.

10. The bidirectional converter according to claim 9, wherein the bidirectional converter further comprises:

a capacitor, wherein a first endpoint of the first bidirectional conversion circuit is connected to a first endpoint of the second bidirectional conversion circuit and is connected to a positive end of the capacitor, and a third endpoint of the first bidirectional conversion circuit is connected to a third endpoint of the second bidirectional conversion circuit and is connected to a negative end of the capacitor.

11. A bidirectional converter, comprising:

a first bidirectional conversion circuit including a first switch on a first branch and a second switch for a second branch for conversion of direct current (DC)/alternating current (AC) or AC/DC voltages through the first and second branches;

a second bidirectional conversion circuit;

a third bidirectional conversion circuit;

a transformer, wherein the transformer comprises a primary-side winding and a secondary-side winding, one end of the secondary-side winding of the transformer is connected to a second endpoint of the first bidirectional conversion circuit, and the other end of the secondary-side winding of the transformer is connected to a second endpoint of the second bidirectional conversion circuit;

a resonant cavity, wherein the resonant cavity comprises a first port, a second port, a third port, and a fourth port, the first port is connected to a second endpoint of the third bidirectional conversion circuit, the second port is connected to a third endpoint of the third bidirectional conversion circuit, and the third port and the fourth port are separately connected to the primary-side winding of the transformer; and a bridgeless power factor correction (PFC) circuit, wherein the bridgeless PFC circuit comprises two alternating current (AC) ports and two direct current (DC) ports, and the two DC ports are separately connected to a first endpoint and the third endpoint of the third bidirectional conversion circuit.

12. The bidirectional converter according to claim 11, wherein the bidirectional converter further comprises:

a capacitor, wherein a first endpoint of the first bidirectional conversion circuit is connected to a first endpoint of the second bidirectional conversion circuit and is connected to a positive end of the capacitor, and a third endpoint of the first bidirectional conversion circuit is connected to a third endpoint of the second bidirectional conversion circuit and is connected to a negative end of the capacitor.

* * * * *